Dec. 11, 1956 D. P. SCHIAVO 2,773,828
BUBBLE ENERGIZED FILTER FOR AQUARIUM
Filed April 12, 1954
FIG_1
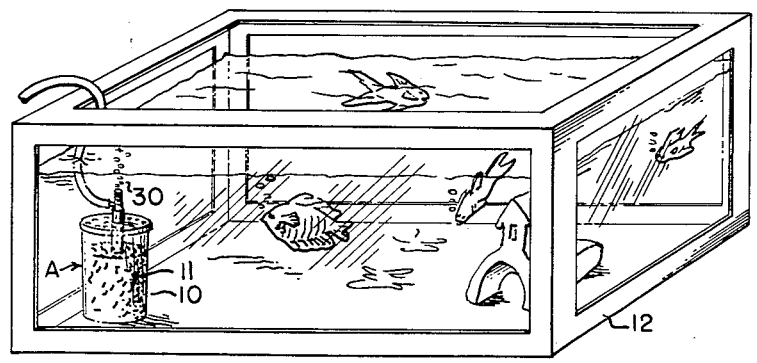
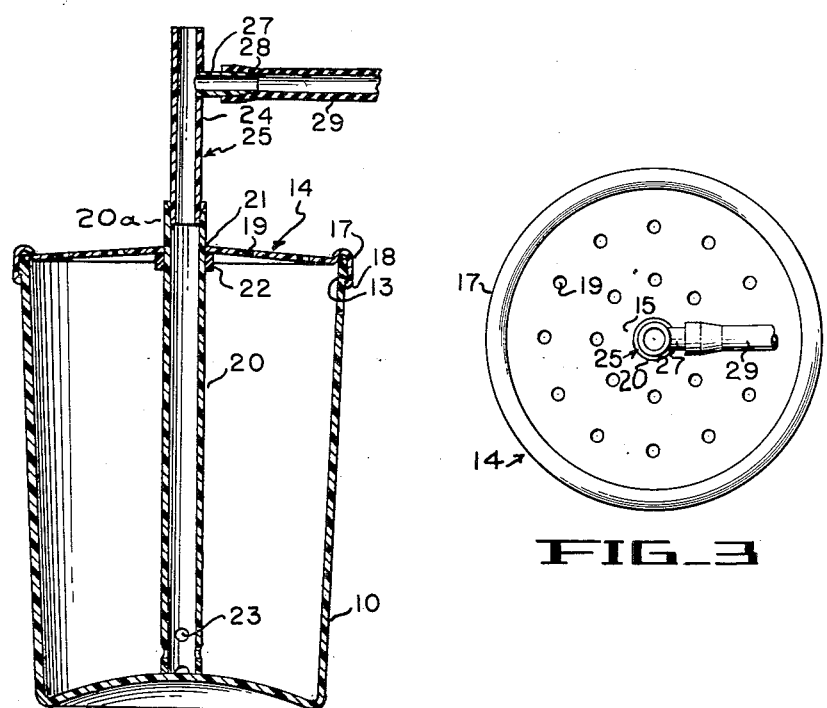
FIG_2
FIG_3
INVENTOR.
DOMINIC P. SCHIAVO
BY
Hansen and Lane
ATTORNEYS

2,773,828
BUBBLE ENERGIZED FILTER FOR AQUARIUM

Dominic P. Schiavo, San Jose, Calif.

Application April 12, 1954, Serial No. 422,523

2 Claims. (Cl. 210—16)

The present invention relates to filters, and pertains more particularly to a filter for use particularly in small aquariums of the types used in homes. At present the hobby of raising small fish of tropical varieties has attained considerable importance in the United States. Many species of small fish, particularly of tropical varieties, now are kept and raised by people of all classes throughout the United States.

Many of these small fish are very sensitive to lack of aeration and impurities in the water, and various types of aerators and filters have been devised to keep the water of such aquariums properly aerated and relatively free from dirt and other impurities. A common type of aquarium filter is one wherein a quantity of granulated filtering material such as charcoal is housed in a container and the water in the aquarium is drawn through the filtering material by a current of air generated by a series of bubbles passing upwardly through a vertical tube extending upwardly through the water. A filter of this general type is shown in Patent No. 2,653,908 to Rodda, issued September 29, 1953. While filters of this general character operate satisfactorily as far as filtering of the water is concerned, they are relatively expensive to make, it is sometimes difficult to change the filtering material or to rinse out the filter even when it is not desired to change the filtering material.

The present invention contemplates the provision of an improved, easily cleaned filter for use in small aquariums. The invention also provides an easily installed and removed device for filtering the water of an aquarium, and one wherein a filled filter housing is easily removed for replacement or cleaning. Another object is to provide a filter for a small aquarium having a container for filtering medium with an easily removable perforated cover and having a vertical standpipe removably sealed to the cover and constructed to draw water from the aquarium downwardly through the contents of the container and thence back into the aquarium, the device being constructed for easy removal and replacement therein.

These and other objects and advantages of the invention will be apparent from the following description and the accompanying drawings wherein:

Fig. 1 is a perspective view of a small, home-type aquarium having a filter embodying the invention mounted therein.

Fig. 2 is an enlarged vertical, diametrical sectional view through the filtering device shown in Fig. 1, an air supply hose being broken away.

Fig. 3 is a plan view of the filtering device shown in Fig. 2.

Referring to the drawings in detail, a device A for continuously filtering the water of a small aquarium comprises a cup-shaped container 10 of a size to hold a sufficient quantity 11 of a suitable filtering material for an aquarium 12 of a predetermined size. For example, for a one or two gallon aquarium, the capacity of the container 10 preferably should be of the order of four to six liquid ounces. Larger aquariums should be provided with filters of proportionately larger size.

The filter container 10 preferably is molded of clear transparent material such as, for example, glass or a hard finished styrene material. A small cover engaging flange 13 is provided around its open upper end. A cover 14 preferably of somewhat resilient molded plastic material is fitted closely but removably over the top of the container 10. The cover 14 comprises a substantially flat central portion 15 and a downwardly extending marginal flange 17. The lower edge portion 18 of the cover flange 17 is offset inwardly to fit beneath the container top flange 13 to retain the cover 14 thereon by means of the resiliency of the cover material. The cover 14 is provided with a multiplicity of small perforations 19 throughout a major portion of its area to permit the influx of water into the container 10 in a manner to be described later herein.

An upright central tube or stand-pipe 20 is of a diameter to fit within a central opening 21 in the cover 14. The stand-pipe 20 is of a length to project at 20a above the cover 14 when mounted upright therewith with its lower end resting on the bottom of the container 10 as shown in Fig. 2. Collar 22 to support the center of the cover and to seal the joint between the stand-pipe 20 and the cover 14 is fitted around the stand-pipe at a height to flex the central portion of the cover 14 upwardly slightly as shown in Fig. 2. This upward flexing of the cover is for the principal purpose of exerting a resilient downward pressure on the stand-pipe against the bottom of the container to resist lateral displacement of the lower end of the tube within the container.

The lower end portion of the stand-pipe 20 is provided with several perforations 23 to permit a flow of water from the interior of the container 10 into the lower end of the stand-pipe. The holes 23 are of lesser diameter than the particles of filtering material 11 to be used in the device so as to prevent ingress of the filtering material into the stand-pipe.

The upper end of the stand-pipe 20 is shaped to receive the lower end of the upright tubular head portion 24 of a T-shaped fitting 25 with a press fit therein. The fitting 25 preferably is made from transparent plastic material to permit the observance of air bubbles passing upwardly therethrough in a manner to be described later herein.

The T-shaped fitting 25 has a laterally extending tubular stem portion 27 communicating with the bore of the upright tubular head portion 24, the outer end of the stem preferably being tapered as at 28 (Fig. 2) to facilitate its insertion into the end of a resilient hose 29. The hose 29 in turn is connected to the discharge side of a low capacity air compressor (not shown) of a type commonly employed to supply air in limited quantities for the aeration of small aquariums.

In installing the filtering device A in an aquarium, the cover 14 is removed from the container 10, and, manually holding the stand-pipe 20 in upright condition axially of the container 10, the container is filled with filtering material 11, which may be granular charcoal. A suitable method for holding the stand-pipe 20 in upright position while filling the container 10 is to place one's index finger of the hand holding the container 10 over the open upper end of the stand-pipe. This seals the stand-pipe against the entrance of particles of the filtering material being poured into the container and at the same time holds the stand-pipe in properly centered position.

A suitable depth for the filtering material is approximately two thirds of the depth of the container. When thus filled, the stand-pipe 20 will be held in proper upright position by a filtering material in the container. The cover 14 then is fitted over the upper end of the standpipe 20 to rest on the collar 22 as shown in Fig.

2 with the marginal cover flange 17 overlapping and interengaging the flange 13 surrounding the upper end of the container.

The resilient upward flexing of the central portion of the cover 14 by the collar 22 exerts a downward pressure of the standpipe 20 on the bottom of the container.

The container 10 thus filled then is immersed in the water of the aquarium 12 as illustrated in Fig. 1, in which condition the container 10 fills with water, which enters by gravity through the perforations 19 in the cover. The lower end of the upright head portion 24 of the T-shaped tubular fitting 25 then is fitted into the upper end of the stand-pipe 20. The flexible hose 29 is fitted onto the end of the lateral stem 27 of the T-fitting 25; and the device is ready for operation by the forcing of a small volume flow of air through the hose 29 from the compressor to which it is connected. As air flows through the hose 29 and the lateral stem 27 into the upright head portion 24 of the T-fitting 25, a succession of bubbles 30 (Fig. 1) are formed in the upright head portion 24 above its junction with the stem portion 27. These bubbles, rising through the water filled upper portion of the head portion 24 act like upwardly moving pistons to create an upward flow impulse on the water which fills the stand-pipe 20. This draws water from the container 10 through the holes 23 in the lower end of the stand-pipe which in turn draws water downwardly from that in the aquarium 12 into the container 10 through the openings 19 in the cover 14. This water is gradually drawn downwardly through the filtering material 11 in the container 10, into the stand-pipe 20 and thence upwardly back into the main body of water in the aquarium through the fitting head portion 24.

It is necessary to change the filtering material only at very infrequent intervals. However, it is highly desirable to clean this material frequently. For cleaning purposes, the T-fitting 25 is withdrawn from its interfitted condition within the upper end of the stand-pipe 20. The air hose 29 with the T-fitting 25 attached thereto may be allowed to remain in the aquarium while the filled container 10 with the cover 14 and stand-pipe 20 assembled therewith as shown in Figs. 1 and 2 are removed from the aquarium. Without removing the cover 14 or changing the position of the stand-pipe 20 therein, the filtering material 11 may be cleaned by rinsing.

Preferably this rinsing operation is performed in a tub or lavatory (not shown) filled with clean water to a depth approximately twice that of the container 10. The container may be held first on its side, and then in an inverted position and shaken back and forth while immersed in the water. This frees the dirt and other impurities which have collected on the particles of filtering material during operation of the device in the aquarium. These impurities are carried by the agitation of the water in the container through the holes 19 in the cover, leaving the filtering material 11 clean and ready for reuse. The filter device A then is replaced in the aquarium as shown in Fig. 1, and the head 24 of the T-shaped member 25 again is fitted into the upper end of the stand-pipe 20 as shown in Figs. 1 and 2. Since the hose 29 was not removed from the stem 27 of the T-fitting when removing the container assembly for cleaning, this places the apparatus again in a condition for operation as described previously herein, by passing air into the fitting 25 through the air hose 29.

While I have illustrated and described a preferred form of my invention, it is obvious that a container and cover of rectangular or other suitable cross sectional shape may be employed, instead of the round cross sectional shape illustrated and described herein, and that other changes and modifications may be made without departing from the spirit and scope of the invention as set forth in the appended claims.

Having thus described the invention, what I claim as new and desire to protect by Letters Patent is defined in the following claims.

I claim:

1. In a filter for an aquarium wherein a flow of water is induced through a bed of filtering material by a stream of bubbles passing inwardly through the upright portion of a T-shaped tube fitting; a cup-shaped receptacle for holding a supply of filtering material and for mounting in upright submerged condition in an aquarium, a cover having a plurality of perforations therein removably attached over the open upper end of the receptacle, an upright stand-pipe fitted into an opening in the cover for insertion through filtering material to the bottom of the receptacle, the upper end of the stand-pipe projecting above the cover for connection of the upright portion of a T-fitting thereto, and a projection on the stand-pipe for engagement by the cover at a height to press the lower end of the stand-pipe into engagement with the bottom of the receptacle, the lower end of the stand-pipe being formed for open communication with the interior portion of the receptacle, whereby suction on the upper end of the stand-pipe draws water through the perforations in the cover, downwardly through filtering material in the receptacle and thence upwardly through the stand-pipe.

2. In a filter for an aquarium wherein a flow of water is induced through a bed of filtering material by a stream of bubbles passing upwardly through the upright portion of a T-shaped tube fitting; a cup-shaped receptacle open only at its top to receive a layer of filtering material particles therein, a cover retaining bead formed peripherally about the upper rim of the receptacle, a perforated flexible cover removably mounted to close the open top of said receptacle, a resilient marginal flange on said cover for releasably gripping the bead on the upper rim of said receptacle, an upright stand-pipe mounted in non-sealing relation on the closed bottom of said receptacle and passing upwardly through the center of said cover, a collar secured around the stand-pipe at a height to urge the central portion of the cover upwardly thereby to exert a downward pressure on the stand-pipe against the bottom of the receptacle, whereby suction on the upper end of the standpipe draws water through the perforations in the cover, downwardly through the filtering material in the receptacle and thence upwardly through the standpipe.

References Cited in the file of this patent

UNITED STATES PATENTS

| | | |
|---|---|---|
| 2,024,646 | Jones | Dec. 17, 1935 |
| 2,293,051 | Duffey | Aug. 18, 1942 |
| 2,533,936 | Holmes et al. | Dec. 12, 1950 |
| 2,614,529 | Hansen | Oct. 21, 1952 |
| 2,653,908 | Rodda | Sept. 29, 1953 |
| 2,674,574 | Pettas | Apr. 6, 1954 |
| 2,676,921 | Vanteenskiste | Apr. 27, 1954 |